US009023544B2

(12) United States Patent
Hatano et al.

(10) Patent No.: US 9,023,544 B2
(45) Date of Patent: May 5, 2015

(54) FUEL CELL SYSTEM (75) Inventors: Susumu Hatano, Shiga (JP); Shigeki Yasuda, Osaka (JP); Hidetoshi Wakamatsu, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 286 days.

(21) Appl. No.: 13/817,787

(22) PCT Filed: Aug. 9, 2011

(86) PCT No.: PCT/JP2011/004510
§ 371 (c)(1),
(2), (4) Date: Feb. 19, 2013

(87) PCT Pub. No.: WO2012/023261
PCT Pub. Date: Feb. 23, 2012

(65) Prior Publication Data
US 2013/0149618 A1 Jun. 13, 2013

(30) Foreign Application Priority Data
Aug. 17, 2010 (JP) ................................. 2010-182031

(51) Int. Cl.
H01M 8/04 (2006.01)
H01M 8/24 (2006.01)
H01M 8/06 (2006.01)

(52) U.S. Cl.
CPC ...... *H01M 8/04335* (2013.01); *H01M 8/04007* (2013.01); *H01M 8/04156* (2013.01); *H01M 8/04373* (2013.01); *H01M 8/04708* (2013.01); *H01M 2250/10* (2013.01); *Y02E 60/50* (2013.01); *Y02B 90/14* (2013.01);
(Continued)

(58) Field of Classification Search
CPC .......... H01M 8/0618; H01M 8/04335; H01M 8/04–8/04268
See application file for complete search history.

(56) References Cited

U.S. PATENT DOCUMENTS

2004/0103419 A1 5/2004 Kuo et al.
2005/0266295 A1 12/2005 Takai
2010/0221629 A1 9/2010 Akimoto et al.

FOREIGN PATENT DOCUMENTS

EP 1826858 A1 8/2007
JP 02-064278 A 3/1990
(Continued)

OTHER PUBLICATIONS

European Search Report issued in corresponding European Application No. 11817911.8, dated Jan. 3, 2014, 4 pages.
(Continued)

*Primary Examiner* — Ula C Ruddock
*Assistant Examiner* — Thomas Parsons
(74) *Attorney, Agent, or Firm* — McDermott Will & Emery LLP (57) ABSTRACT A fuel cell system (1A) comprises a casing (2) having a suction port (31) through which air is introduced from outside into an internal space thereof; a fuel cell (4) accommodated within the casing (2) and configured to generate electric power through an electrochemical reaction between a fuel gas and an oxidizing gas; an air supply unit (6) of a diaphragm type disposed within the casing (2) and configured to take in the air introduced through the suction port (31) and supply the air to the fuel cell (4); and a heating unit (30) disposed within the casing (2) and configured to heat the air in a space from the suction port (31) to the air supply unit (6).

6 Claims, 6 Drawing Sheets

(52) U.S. Cl.
CPC ......... *H01M 8/0612* (2013.01); *H01M 8/2475* (2013.01); *H01M 8/04089* (2013.01); *H01M 8/04253* (2013.01); *H01M 2250/405* (2013.01); *Y02B 90/16* (2013.01)

(56) References Cited

FOREIGN PATENT DOCUMENTS

| | | |
|---|---|---|
| JP | 10-284107 A | 10/1998 |
| JP | 2005-032585 A | 2/2005 |
| JP | 2005-259494 A | 9/2005 |
| JP | 2005-273477 A | 10/2005 |
| JP | 2006-107941 A | 4/2006 |
| JP | 2007-165118 A | 6/2007 |
| JP | 2008-084564 A | 4/2008 |
| JP | 2008-210627 A | 9/2008 |
| JP | 2009-230909 A | 10/2009 |
| JP | 2010-062142 A | 3/2010 |
| JP | 2010-086916 A | 4/2010 |
| JP | 2010-257580 A | 11/2010 |

OTHER PUBLICATIONS

International Search Report mailed Nov. 22, 2011 issued in corresponding International Application No. PCT/JP2011/004510.

FUEL CELL SYSTEM

RELATED APPLICATIONS

This application is the U.S. National Phase under 35 U.S.C. §371 of International Application No. PCT/JP2011/004510, filed on Aug. 9, 2011, which in turn claims the benefit of Japanese Application No. 2010-182031, filed on Aug. 17, 2010, the disclosures of which Applications are incorporated by reference herein.

TECHNICAL FIELD

The present invention relates to a fuel cell system which generates electric power through an electrochemical reaction between a fuel gas and an oxidizing gas.

BACKGROUND ART

In recent years, as a new form of a power generation system, a fuel cell system has been proposed. The fuel cell system has many advantages that it is capable of easily implementing small-capacity and distributed power generation, is suitable for use in in-house power generation in each facility, does not generate harmful substances such as NOx and SOx, generates a low noise, and is applicable to cold districts.

Patent Literature 1 discloses such an exemplary configuration of the fuel cell system 1. Specifically, the fuel cell system disclosed in Patent Literature 1 includes a fuel cell main body, a fuel gas generating device, an air supply unit (air blower), an electric power converter (inverter), a heat recovery device, etc. Among these devices, the fuel gas generating device generates a hydrogen gas from a natural gas which is a raw material gas, and the air supply unit supplies oxygen to a fuel cell. The fuel cell generates electric power through an electrochemical reaction between the hydrogen gas and the oxygen. The electric power converter converts an electric energy generated in the fuel cell into a voltage and a frequency which are the same as those of electric power in a commercial power utility. The heat recovery device recovers heat generated in the fuel cell and the fuel gas generating device by a heat exchanger built into the heat recovery device and supplies the heat to another outside device which utilizes exhaust heat. Patent Literature 1 teaches that an electric motor for actuating the air supply unit is cooled by the air introduced by the air supply unit.

By the way, in cases where the fuel cell system is used in cold districts, there may be a possibility that water (e.g., water within a fuel cell stack) used within the system is frozen. This will be described more specifically. In the fuel cell system, it is necessary to take in air required for power generation from outside of a casing. In some cases, the interior of the casing of the fuel cell system is ventilated by the air taken in from outside. If an attempt is made to cover electric power and hot water consumed at home by electric power and hot water generated in the fuel cell system, the fuel cell system must be operated continuously for a long period of time, which reduces durable years (expected lifetime) of the system. To avoid this, typically, the fuel cell system is deactivated (stopped) during a nighttime when a consumption amount of the electric power and a consumption amount of the hot water at home are less, while the fuel cell system is activated (started-up) in early morning when the consumption amount of the electric power and the consumption amount of the hot water at home start increasing.

However, throughout the year, the fuel cell system installed in an outdoor location is forced to be operated under an outside air temperature in a range of, for example, a temperature lower than 0 degrees C. to about 40 degrees C. Because of this, especially in a case where the fuel cell system is activated in early morning in the deactivated state during a nighttime in a winter season, water inside a water tank and water within a water pipe in the fuel cell system may be frozen, which causes a trouble in an operation of the fuel cell system.

Figure 6:
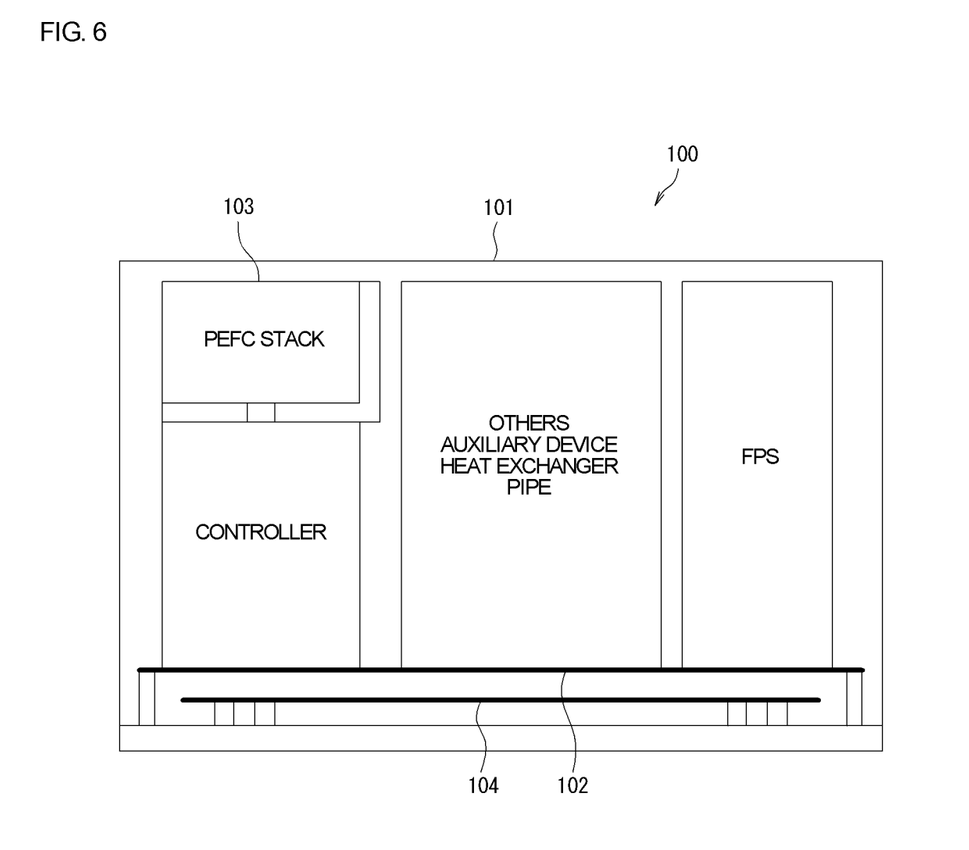
FIG. 6 is a block diagram showing a schematic configuration of a fuel cell system according to a prior art.

To address the above stated problem, Patent Literature 2 discloses that a sheath heater for heating an entire fuel cell system is provided. FIG. 6 is a block diagram showing a schematic configuration of a fuel cell system according to a prior art disclosed in Patent Literature 2. As shown in FIG. 6, a fuel cell system 100 includes a plate-shaped mount plate 102 in an internal space of a casing 101. On and above the mount plate 102, internal devices including a PEFC stack 103 are mounted. The mount plate 102 is provided with legs. Therefore, the mount plate 102 is placed to be spaced apart from an inner bottom surface of the casing 101. Between the inner bottom surface of the casing 101 and the mount plate 102, a sheath heater 104 for heating the internal space of the casing 101 is provided.

Patent Literature 3 and Patent Literature 4 disclose a means for heating the entire fuel cell system for the purpose of anti-freezing. For example, in Patent Literature 3, a cooling air inlet opening is provided at a lower portion of a casing accommodating a fuel cell, and a blower attached on a lower portion of the interior of the casing is actuated to take in outside air through the opening and supply the air to the fuel cell (see paragraph 0016, 0020). Patent Literature 3 discloses that in a low-temperature condition, a surface heater heats the lower portion of the casing to increase a temperature of the entire casing (see paragraph 0022). Patent Literature 4 also discloses that a heating means for heating the entire fuel cell system is provided (see, for example, Claim 1).

There is a fuel cell system in which an air pump of a diaphragm type is used as an air supply unit. Patent Literature 5 and Patent Literature 6 disclose a general technique about the air supply unit of the diaphragm type.

CITATION LISTS

Patent Literature

Patent Literature 1: Japanese Laid-Open Patent Application Publication No. 2008-84564
Patent Literature 2: International Publication No. 2009/034997
Patent Literature 3: Japanese Laid-Open Patent Application Publication No. 2006-107941
Patent Literature 4: Japanese Laid-Open Patent Application Publication No. 2005-32585
Patent Literature 5: Japanese Laid-Open Patent Application Publication No. Hei. 2-64278
Patent Literature 6: Japanese Laid-Open Patent Application Publication No. 2005-273477

SUMMARY OF THE INVENTION

Technical Problem

The air supply unit of the diaphragm type has many advantages that the air supply unit has a simple structure, has high durability, and is inexpensive. However, the diaphragm is mainly formed of rubber and is more likely to be hardened in a low-temperature environment, and thereby, for example, an amount of air supplied with a pressure by the air supply unit is reduced, which makes it difficult for the air supply unit to perform a desired performance. Under the circumstances, in the case of the fuel cell system using the air supply unit of the diaphragm type, an outside air temperature environment in which the fuel cell system can be used is limited.

As approaches for solving this problem, Patent Literatures 2 to 4 disclose a fuel cell system including a heating means, which is not a configuration for preventing the temperature of the air supply unit from being lowered. Thus, a means for solving the problem is not disclosed. Any of the Patent Literatures do not disclose that the above stated problem occurs in the low-temperature environment when the air supply unit of the diaphragm type is used in the fuel cell system.

Accordingly, an object of the present invention is to provide a fuel cell system including an air supply unit of a diaphragm type which can perform a desired performance and being capable of performing a stable power generation operation, even in a low outside-air temperature condition.

Solution to Problem

A fuel cell system of the present invention comprises a casing having a suction port through which air is introduced from outside into an internal space thereof; a fuel cell accommodated within the casing and configured to generate electric power through an electrochemical reaction between a fuel gas and an oxidizing gas; an air supply unit of a diaphragm type disposed within the casing and configured to take in the air introduced through the suction port and supply the air to the fuel cell; and a heating unit disposed within the casing and configured to heat the air in the space from the suction port to the air supply unit.

In such a configuration, since the air heated by the heating unit is introduced into the air supply unit, the air supply unit can be heated surely, and a decrease in the amount of the air supplied with a pressure from the air supply unit can be suppressed. To ensure the amount of the air supplied with a pressure from the air supply unit under a low-temperature environment, a volume of the air supply unit may be increased. In this case, a size of the air supply unit is inevitably increased, which is undesirable to a fuel cell system installed at home. By comparison, the fuel cell system of the present invention has an advantage that the above stated problem can be solved by using a small-sized air supply unit without increasing the size of the air supply unit.

The fuel cell system may further comprise: a fuel gas generating device for generating a fuel gas supplied to the fuel cell, using a raw material and water; and a water circuit including a condensed water recovery passage for recovering condensed water from at least one of an off-gas from an anode of the fuel cell, an off-gas from a cathode of the fuel cell; and an off-gas from the fuel gas generating device; and a water tank for storing the condensed water; wherein the heating unit may be positioned to heat at least a portion of the water circuit.

In such a configuration, the water within the water circuit can be prevented from being frozen (can be unfrozen) while heating the air introduced into the air supply unit. The diaphragms of the air supply unit are hardened and the water within the water circuit is frozen in a low-temperature environment. The use of the heating unit in the above manner can efficiently address both of the problems.

The portion of the water circuit which is heated by the heating unit is disposed in a space from the suction port to the air supply unit.

In such a configuration, the water circuit can be heated more surely and the water within the water circuit can be prevented from being frozen more surely.

The fuel cell system may further comprise: a separating plate for separating the internal space of the casing into an upper space and a lower space, the separating plate having a communication port via which the upper space and the lower space are communicated with each other; wherein the fuel cell and the air supply unit may be disposed within the upper space, and the air supply unit may be communicated with the lower space via the communication port; and wherein the lower space may form an air introduction space through which the air introduced from the suction port flows to the communication port passes, and the heating unit may be disposed in the air introduction space.

In such a configuration, the air within the air introduction space having a smaller volume than the entire casing can be heated efficiently, and further, the heated air can be introduced into the air supply unit. Therefore, since the air heated by the heating unit can be introduced more surely into the air supply unit, it is possible to appropriately prevent the diaphragms from being hardened even during use under the low-temperature environment. Since the air supply unit is disposed in the upper space defined by the separating plate, it is positioned above a ground surface of the casing such that the air introduction space is present below the upper space. Because of this, the air introduction space forms a heat insulating layer so that heat of the air supply unit is suppressed from being deprived by the low-temperature ground surface. Thus, the temperature of the air supply unit is suppressed from being lowered.

The separating plate may be comprised of a single plate member, or a plurality of (two or more) plate members. The separating plate need not be flat but may be configured in multiple step forms. The separating plate need not define the upper space and the lower space with air tightness except for the communication port, but may have through-hole(s) and gap(s) in addition to the communication port. It is sufficient that the separating plate at least separates the internal space of the casing into the upper space and the lower space at a boundary which is the separating plate.

The fuel cell system may further comprise a fuel gas generating device for generating a fuel gas supplied to the fuel cell, using a raw material and water; and a water circuit including a condensed water recovery passage for recovering condensed water from at least one of an off-gas from an anode of the fuel cell, an off-gas from a cathode of the fuel cell; and an off-gas from the fuel gas generating device; and a water tank disposed in the upper space to store the condensed water; wherein at least a portion of the water circuit may be exposed in the air introduction space.

In such a configuration, by heating the air introduced into the air supply unit, the diaphragm can be prevented from being hardened, and water within the water circuit can be prevented from being frozen (or can be unfrozen). In addition, the air heated by the heating unit can be introduced more surely into the air supply unit, and a temperature of the air supply unit is suppressed from being lowered, by a heating insulation action within the air introduction space.

The fuel cell system may further comprise: a fuel gas generating device for generating a fuel gas supplied to the fuel cell, using a raw material and water; and a water circuit including a condensed water recovery passage for recovering condensed water from at least one of an off-gas from an anode of the fuel cell, an off-gas from a cathode of the fuel cell; and an off-gas from the fuel gas generating device; and a water tank disposed in the upper space to store the condensed water;

wherein the separating plate has a penetrating section via which the upper space and the air introduction space are communicated with each other to supply the air within the air introduction space which is heated by the heating unit, to at least a portion of the water circuit positioned in the upper space.

In such a configuration, the air heated within the air introduction space can be supplied to the water circuit via the penetrating section of the separating portion. Therefore, the air introduced into the air supply unit can be heated, and the water circuit can be heated. As the penetrating section, a hole-shape penetrating the separating plate may be used. In a case where the separating plate is comprised of a plurality of plate members, a gap is provided between adjacent plate members, as the penetrating section.

The fuel cell system may further comprise an air introduction passage extending from the communication port of the separating plate to the air supply unit; and a filter provided at the air introduction passage to capture foreign matters in the air.

In such a configuration, it is possible to suppress the temperature of the air supply unit from being lowered by utilizing a heat capacity of the filter. Specifically, the filter provided in the air introduction passage is heated by the air heated by the heating unit while the heated air is introduced into the air supply unit. The filter has a certain heat capacity, and is capable of holding heat according to the heat capacity. Therefore, after the filter has been heated, the air can be heated by the heat owned by the filter. Thus, it is possible to suppress the temperature of the air supply unit from being lowered.

The fuel cell system may further comprise a control unit for controlling an operation of the heating unit; wherein the control unit may cause the heating unit to heat the air prior to start of the operation of the air supply unit.

In such a configuration, since the air to be introduced into the air supply unit is warned up in advance. Therefore, it is possible to surely prevent the diagraphs of the air supply unit from being hardened by low-temperature air.

The fuel cell system may further comprise a control unit for controlling an operation of the heating unit; and a temperature sensor for detecting a temperature of the air supplied to the air supply unit; wherein the control unit may cause the heating unit to heat the air when the temperature of the air supplied to the air supply unit which is detected by the temperature sensor is lower than a predetermined value.

In such a configuration, when the low-temperature air is introduced into the air supply unit, the heating unit is actuated to heat the air. Thus, it is possible to more surely prevent the diagraphs of the air supply unit from being hardened by low-temperature air. If the temperature of the introduced air is equal to or higher than the predetermined value, the heating unit is not actuated, which can achieve electric power saving. The above stated predetermined value relating to the temperature may be an air temperature corresponding to a pump performance which is allowable and minimum, in view of degradation of the pump performance due to the decrease in the air temperature (i.e., hardening of the diagraphs). More specifically, the predetermined value may fall into a range of 0 degrees C. to 10 degrees C., and more preferably in a range of 3 degrees C. to 5 degrees C.

The fuel cell system may further comprise a control unit for controlling an operation of the heating unit; wherein the control unit may obtain an amount of power generation in the fuel cell or an amount of the air supplied from the air supply unit during a power generation of the fuel cell, and may cause the heating unit to increase heat applied to the air as the obtained value is greater.

The amount of the air introduced into the air supply unit increases as the power generation amount increases. Therefore, in the above configuration, heat can be generated with an amount corresponding to the amount of the air introduced into the air supply unit, and the introduced air can be adjusted at a suitable temperature. Therefore, even when the air is introduced into the air supply unit with a great amount, the air can be heated surely and the diaphragms can be prevented from hardening. On the other hand, when the air is introduced into the air supply unit with a small amount, excess heating can be prevented, and electric power saving can be achieved.

Advantageous Effects of the Invention

In accordance with the fuel cell system of the present invention, since the air which has been heated by the heating unit is introduced into the air supply unit of a diaphragm type, it is possible to surely heat the diaphragms of the air supply unit, and to suppress reduction of the amount of air supplied with a pressure due to hardening of the diaphragms.

DESCRIPTION OF THE EMBODIMENTS

Hereinafter, embodiments of the present invention will be described with reference to the drawings. The present invention is not limited to the embodiments described below.

Embodiment 1

Figure 1:
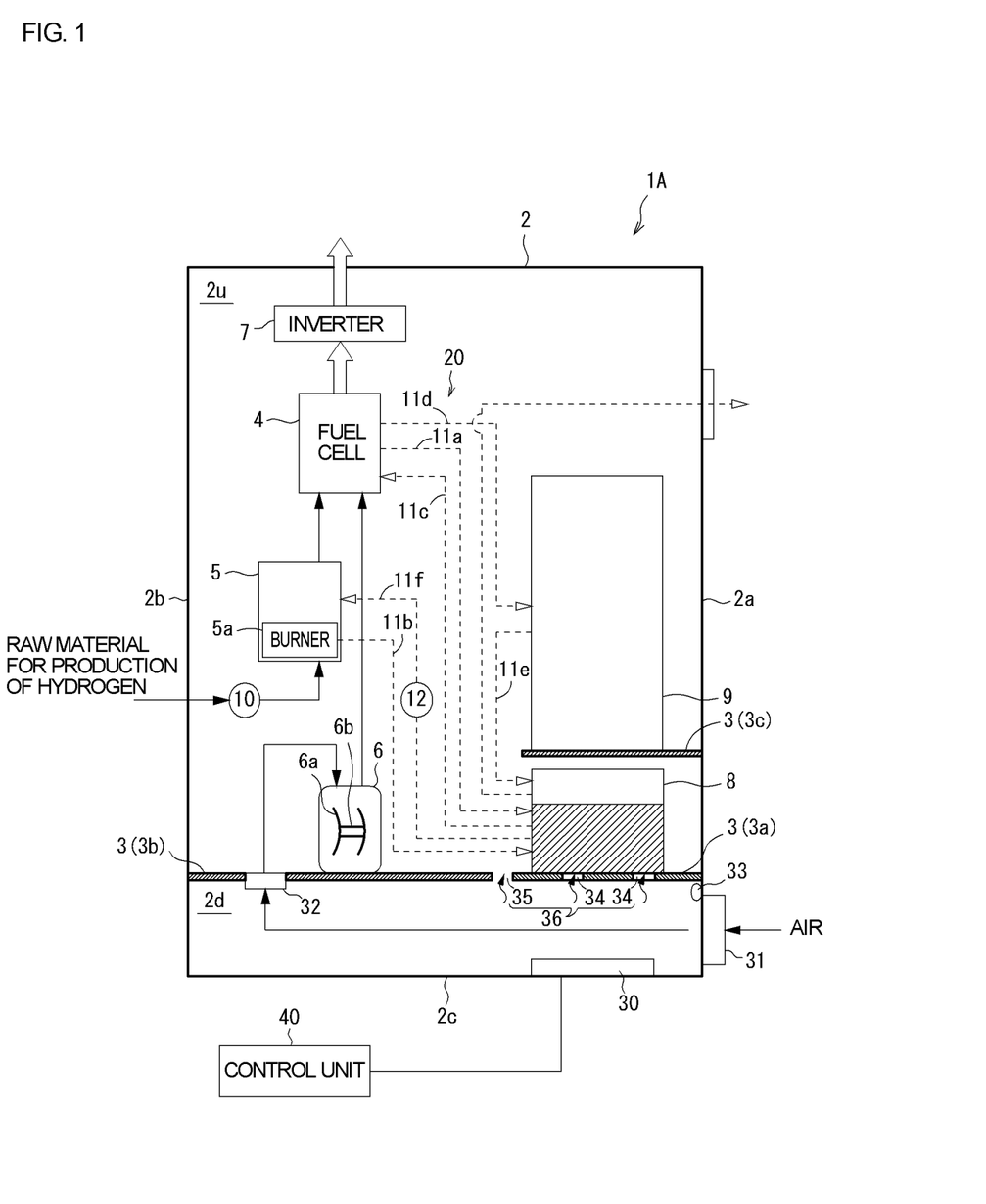
FIG. 1 is a schematic view showing a configuration of a fuel cell system according to Embodiment 1 of the present invention.

FIG. 1 is a schematic view showing a configuration of a fuel cell system according to Embodiment 1 of the present invention. A fuel cell system 1A according to the present embodiment can be used as an in-house power generation apparatus at home or in facilities. As shown in FIG. 1, the fuel cell system 1A includes a casing 2 having at least a first side wall 2a and a second side wall 2b which are formed of a metal plate and face each other, and a bottom wall 2c. In the present embodiment, as a typical example of the casing 2, there is illustrated a casing having a rectangular parallelepiped shape which is elongated in a vertical direction.

An internal space of the casing 2 is separated into an upper space 2u and a lower space 2d by a separating plate 3. The separating plate 3 is provided in a position which is relatively closer to the bottom wall 2c of the casing 2, and therefore the upper space 2u is larger than the lower space 2d. A fuel cell 4, a fuel gas generating device 5, an air supply unit 6 of a diaphragm type, an inverter 7, a water tank 8, another components 9, etc., are accommodated in the upper space 2u, while a heating unit 30 is accommodated in the lower space 2d.

The fuel cell 4 disposed in the upper space 2u is configured to perform power generation using a raw material from which hydrogen is produced, and has a structure in which a plurality of cells are stacked together. Each cell is comprised of an anode, a cathode, and a polymer electrolyte sandwiched between the anode and the cathode. A separator intervenes between adjacent cells. As a raw material for use in the power generation in the fuel cell 4, a compound containing carbon and hydrogen in molecules such as hydrocarbon, alcohol, or ether, may be used. Preferable examples which are available as industrial or commercial raw material are methanol, ethanol, dimethyl ether, methane, a city gas, LPG (liquefied petroleum gas), etc. In addition, there are hydrocarbon oil such as gasoline obtained from petroleum, naphtha, kerosene petroleum, and light oil.

The fuel gas generating device 5 includes a burner 5a. The fuel gas generating device 5 reforms the raw material fed with a pressure by a fuel boosting blower 10 provided within the upper space 2u, by a steam reforming reaction, to generate a fuel gas containing hydrogen. The generated fuel gas is supplied to the anode of the fuel cell 4 via a pipe.

Air is supplied from the air supply unit 6 to the cathode of the fuel cell 4 via a pipe. The air supply unit 6 is of a diaphragm type, and includes diaphragms 6a formed mainly of rubber, and a driving section 6b for driving the diaphragms 6a to change a capacity of the interior of the casing, inside of the casing having air tightness. Specifically, the air supply unit 6 includes two diaphragms 6a defining two spaces and is configured such that the diaphragms 6a are coupled to end portions of a rod reciprocatable by an action of an electromagnet. The air supply unit 6 is configured in such a manner that the rod reciprocates to suction air into one space and evacuate the air from the other space alternately in repetition, thereby feeding the air with a pressure continuously. The other structure of the air supply unit 6 of a diaphragm type is not particularly limited so long as the air supply unit 6 has the diaphragms 6a and the driving section 6b, and a known air supply unit 6 of a diaphragm type may be used.

The fuel cell 4 is configured to perform an electrochemical reaction to generate electric power, using the fuel gas supplied from the fuel gas generating device 5 and the air supplied from the air supply unit 6. The generated DC power is converted by the inverter 7 into AC power having a frequency equal to a frequency of, for example, power supply utility, and is supplied to a power load within a home.

The water tank 8 is a water storage tank having a predetermined volume. The water tank 8 recovers condensed water from an off-gas discharged from the anode of the fuel cell 4 during the power generation operation, an off-gas discharged from the cathode of the fuel cell 4 during the power generation operation, and a combustion exhaust gas discharged from the fuel gas generating device 5 during the power generation. To this end, the water tank 8 is connected to the fuel cell 4 via a pipe 11a and to the fuel gas generating device 5 via a pipe 11b.

The condensed water recovered by the water tank 8 is circulated inside of the system 1A and used in respective devices for various uses. For example, the water is supplied from the water tank 8 to the separator between the cells via a pipe 11c, to cool the fuel cell 4 generating heat during the power generation. The water which has cooled the fuel cell 4 and has a high temperature is supplied to another components 9 via a pipe 11d. The components 9 include a heat exchanger (not shown), which recovers the heat from the supplied high-temperature water to generate hot water used at home. The water passes through the heat exchanger and is recovered again to be supplied to the water tank 8 via a pipe 11e.

Furthermore, the water is supplied from the water tank 8 to the fuel gas generating device 5 via a pipe 11f. This water is used as reforming water for performing a reforming reaction to generate the fuel gas from the raw material. A pipe 11f is provided with a reforming water pump 12. By actuating the reforming water pump 12, an amount of supply of the reforming water is suitably adjusted.

As described above, in the system 1A, the recovered condensed water is used as cooling water or reforming water, which is recovered again. For implementing the circulation of the water, the water tank 8 and the pipes 11a to 11f constitute a water circuit 20. To purify the cooling water supplied to the fuel cell 4, an ion exchange resin (not shown) is provided in a suitable location of the water circuit 20. To adjust an amount of the water flowing within the water circuit 20, a pump, a valve, and others may be suitably provided in addition to the reforming water pump 12. To adjust an amount of the water inside of the water tank 8, water can be supplied from outside of the system and can be discharged to outside the system.

The lower space 2d defined by the separating plate 3 forms an outside air introduction space through which the air taken in from outside is introduced into the air supply unit 6. A heating unit 30 is provided within the outside air introduction space. Hereinafter, the lower space 2d will also be referred to as "outside air introduction space 2d."

More specifically, a suction port 31 is provided on a portion defining outside air introduction space 2d in the first side wall 2a of the casing 2 to provide air communication between inside and outside. The separating plate 3 is provided with a communication port 32 via which the upper space 2u and the outside air introduction space (lower space) 2d are communicated with each other. An air introduction passage 13 formed of a pipe extends from the communication port 32 to the air supply unit 6 within the upper space 2u. In this configuration, upon the air supply unit 6 being actuated, a negative pressure is generated inside thereof, and thereby the outside air is supplied to the air supply unit 6 via the suction port 31, the outside air introduction space 2d, the communication port 32, and the outside air introduction passage 13.

A temperature sensor 33 is attached on a portion (inner side wall surface of the first side wall 2a of the casing 2 in the present embodiment) in the vicinity of the suction port 31 within the outside air introduction space 2d. The temperature sensor 33 is configured to detect a temperature of the outside air taken in through the suction port 31. A heating unit 30 including, for example, a sheath heater is disposed on the bottom wall 2c of the casing 2 in the vicinity of the suction port 31 within the outside air introduction space 2d.

The separating plate 3 separating the interior of the casing 2 is not limited to a single plate member but may be a plurality of plate members. In the present embodiment, the separating plate 3 includes a first separating plate 3a located in close proximity to the first side wall 2a and a second separating plate 3b located in close proximity to the second side wall 2b. The above stated water tank 8 is placed on the first separating plate 3a closer to the first side wall 2a rather than the second side wall 2b. The air supply unit 6 is placed on the second separating plate 3b closer to the second side wall 2b rather than the first side wall 2a. In other words, the water tank 8 is positioned above the heating unit 30 and closer to the first side wall 2a provided with the suction port 31, while the air supply unit 6 is positioned closer to the second side wall 2b and apart from the water tank 8. The above stated communication port 32 is provided on the second separating plate 3b in the vicinity of the air supply unit 6.

The first separating plate 3a is provided with through-holes 34 in the vicinity of the water tank 8. A gap 35 is provided between the first separating plate 3a and the second separating plate 3b. The through-holes 34 and the gap 35 form a penetrating section 36 via which the upper space 2u and the outside air introduction space (lower space) 2d are communicated with each other. The penetrating section 36 allows the air to flow from the outside air introduction space 2d to the upper space 2u. In the configuration shown in FIG. 1, as the separating plate 3, a third separating plate 3c protrudes horizontally from the first side wall 2a within the upper space 2u, in addition to the first separating plate 3a and the second separating plate 3b. The above stated components 9 are placed on the third separating plate 3c.

In addition to the above described components, the fuel cell system 1A according to the present embodiment includes a control unit 40. The operations of respective components including the fuel gas generating device 5, the air supply unit 6, the inverter 7 and the heating unit 30 are controlled in accordance with control signals output from the control unit 40, and signals output from respective components including the temperature sensor 33 are input to the control unit 40.

Operation Example 1 of System

Next, the operation of the fuel cell system 1A configured as described above will be described.

To achieve usage of the fuel cell system 4A for a longer period of time (e.g., 10 years), the fuel cell system 1A is placed in a stand-by state (deactivated or stopped), by using a timer, during a time period (e.g., nighttime) for which a consumption amount of electric power and a consumption amount of hot water in a facility in which the system is installed, for example, at home. In morning when the consumption amount of electric power and the consumption amount of hot water increase, the fuel cell system 1A is activated (started-up), and power generation and hot water supply are resumed again. Thus, the fuel cell system 1A repeats the stand-by state, the start-up state and the operation state, which is general usage of the fuel cell system 1A.

However, at a nighttime in a winter season especially in cold districts, an atmospheric temperature is sometimes lowered to a temperature below a freezing point. If the fuel cell system 1A is placed in a stand-by state during the nighttime, the air present in the vicinity of the casing 2 is sometimes lowered to the temperature (e.g., minus 10 degrees C.) below the freezing point. Therefore, in the fuel cell system 1A according to the present embodiment, when the temperature sensor 33 detects a temperature (e.g., temperature lower than 4 degrees C.) at which water might be frozen, the control unit 40 causes the heating unit 30 to be energized (supplied with electric power). Thereby, the components in the fuel cell system 1A, such as the water tank 8 and the water circuit 20, are heated to prevent the components from being frozen. In addition, the temperature of the air within the outside air introduction space 2d is increased to warm-up the air introduced into the air supply unit 6, thereby preventing the diaphragms 6a from being hardened. The air which has been warmed-up in the outside air introduction space 2d is sent to the upper space 2u through the penetrating section 36 provided on the separating plate 3, and flows by natural convection within the upper space, thereby heating the entire interior of the casing 2.

The heating unit 30 may be energized (supplied with electric power) in all states including a period for which the fuel cell system 1A is placed in the stand-by state. Preferably, the heating unit 30 may be energized at least when the fuel cell system 1A in the stand-by state is starting the start-up.

Figure 2:
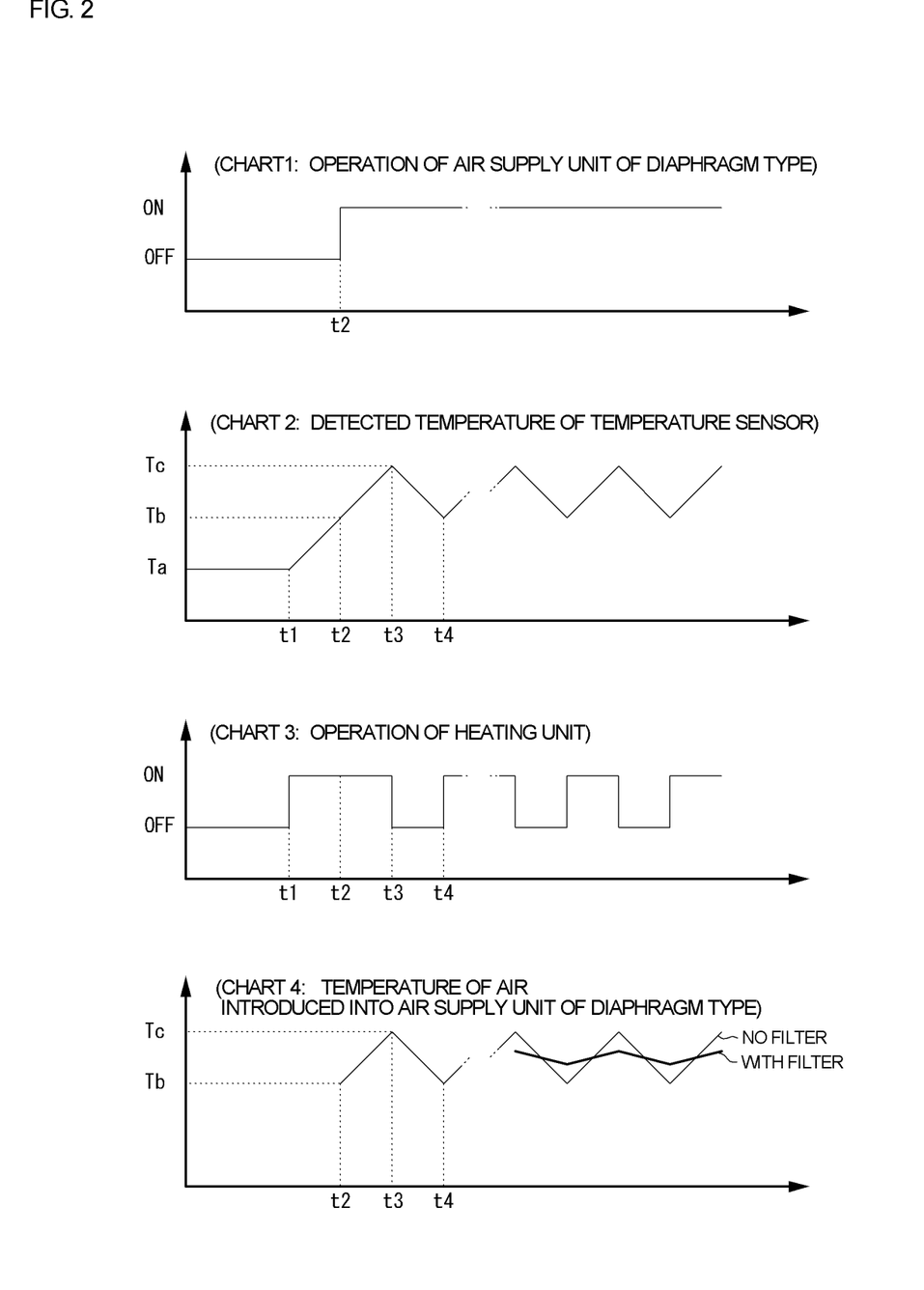
FIG. 2 is a time chart showing an operation of a heating unit which is performed at-start of the fuel cell system in a stand-by state, and the associated another state changes.

FIG. 2 is a time chart showing an operation of the heating unit 30 which is performed at-start of the fuel cell system 1A in the stand-by state, and the associated another state changes. As shown in a chart 1 of FIG. 2, during a time period which passes before time t1, the fuel cell system 1A is placed in the stand-by state, and the air supply unit 6 of a diaphragm type is OFF (deactivated or stopped). As shown in a chart 2, the temperature of the air which is detected by the temperature sensor 33 is a temperature Ta (e.g., minus 2 degrees C.) at which the water is more likely to be frozen. During this time period, as shown in a chart 3, the heating unit 30 is OFF (deactivated).

At time t1, for example, a control command is input to start-up the fuel cell system 1A (see chart 3). The control unit 40 switches the heating unit 30 from OFF to ON (see chart 3). As a result, after time t1, the temperature of the air rises from Ta with a passage of time (see chart 2). At time t2, the temperature of air reaches a lower limit temperature Tb (e.g., 4 degrees C.) at which the water is less likely to be frozen (see chart 2). At this time point, the control unit 40 starts actuating the air supply unit 6. That is, the control unit 40 switches the air supply unit 6 from OFF to ON (actuated) (see chart 1).

In other words, even when a start-up command of the fuel cell system 1A is issued, the air supply unit 6 is not actuated if the temperature of the air which is detected by the temperature sensor 33 is lower than the temperature Tb, whereas the air supply unit 6 is actuated at a time point when the temperature of the air which is detected by the temperature sensor 33 becomes equal to or higher than the temperature Tb. Therefore, as shown in a chart 4, low-temperature air is prevented from being introduced into the air supply unit 6, but relatively warm air having a temperature which is equal to or higher than Tb is introduced into the air supply unit 6. In this way, a problem caused by the fact that the diaphragm is hardened is avoided.

After time t2, the heating unit 30 is maintained in ON-state, and the detected temperature further increases from Tb. At time t3, the detected temperature reaches a temperature Tc (e.g., 10 degrees C.) which is a predetermined threshold at which the water is less likely to be frozen (see chart 2). At this time point, the control unit 40 switches the heating unit 30 from ON to OFF and deactivates (stops) the heating unit 30 (see chart 3). Thus, an excessive temperature increase is prevented and electric power saving is achieved. When the heating unit 30 is stopped, the detected temperature decreases gradually as the outside air is introduced into the outside air introduction space 2d (see chart 2). At time t4, the detected temperature reaches Tb again. At this time point, the heating unit 30 is switched from OFF to ON to prevent a further decrease in the temperature, and the air is heated again. After that, as in the case of time t2 to time t4, the operation control for the heating unit 30 and the temperature change in the air take place in repetition.

By the operation control for the heating unit 30 based on the temperature detected by the temperature sensor 33 as described above, the air introduced into the outside air introduction space 2d can be made to have a suitable temperature which falls within a range of Tb to Tc, and this air can be introduced into the air supply unit 6. Therefore, after time t2, the air having a suitable temperature can be introduced into the air supply unit 6. This, it becomes possible to prevent the diaphragms from being hardened and hence prevent the resulting reduction of an air supply capability. In addition, it is not necessary to increase an amount of electric power supplied to the air supply unit 6 and increase a capacity of the air supply unit 6, to make up for reduction of the air supply capability. As a result, electric power saving consumption, cost reduction, and space saving can be achieved.

The air made to have a suitable temperature in the outside air introduction space 2d is also supplied to the upper space 2u through the penetrating section 36 (through-holes 34 and gap 35), to warm-up the entire interior of the casing 2, including the water circuit 20 (water tank 8 and pipes 11a~11f) and another devices. Since the water tank 8 is placed immediately above the heating unit 30, it is possible to efficiently prevent the water inside the water tank 8 from being frozen. As shown in FIG. 1, the outside air introduction space (lower space) 2d is present between an outside world and the upper space 2u and forms a certain heat insulating space. Therefore, it is possible to suppress the heat from being deprived from the water supply unit 6 by an installation surface (e.g., ground surface) of the casing 2, and to suppress the temperature of the air supply unit 6 from being lowered.

After time t2 when the air supply unit 6 is ON, the fuel cell system 1A is able to shift to the power generation state as soon as another requisite conditions are met. Although the heating unit 30 is not actuated in the stand-by state (before time t1) in the example of FIG. 2, the present invention is not limited to this. For example, even during the stand-by state, the operation of the heating unit 30 may be controlled based on the temperature detected by the temperature sensor 33 so that the temperature of the air within the outside air introduction space 2d is always maintained in the range of Tb to Tc as shown in the case of time t2 to time t4 in FIG. 2. In this way, the fuel cell system 1A can smoothly shift from the stand-by state to the start-up state and then to the power generation state.

The reference temperature Tb at which the heating unit 30 is switched to ON and the reference temperature Tc at which the heating unit 30 is switched to OFF may be suitably set. For example, the temperature Tb may be set to a value in a range of 0 degrees C. to 10 degrees C., and more preferably a value in a range of 3 degrees C. to 5 degrees C. The temperature Tc may be preferably set to a value in a range of 8 degrees C. to 12 degrees C.

Although in the fuel cell system 1A shown in FIG. 1, the through-holes 34 provided on the separating plate 3a are positioned immediately below the water tank 8, the present invention is not limited to this. The through-holes 34 and the gap 35 may be provided in positions which are near the water tank 8, except for the position immediately below the water tank 8, or in another suitable position, so long as the air warmed-up within the outside air introduction space 2d is supplied to the upper space 2u to warm-up the water tank 8. Although the air supply unit 6 and the water tank 8 are directly placed on the separating plate 3 in the example shown in FIG. 1, a spacer having a suitable dimension may be disposed on and above the separating plate 3, and the air supply unit 6 and the water tank 8 may be placed above the separating plate 3 via the spacer.

Operation Example 2 of System

The fuel cell system 1A changes a supply amount of the fuel gas and a supply amount of the air based on a power generation amount of the fuel cell 4. That is, as the power generation amount of the fuel cell 4 is increased, the supply amount of the fuel gas and the supply amount of the air are increased, while as the power generation amount of the fuel cell 4 is decreased, the supply amount of the fuel gas and the supply amount of the air are decreased. In a case where the outside air temperature is low, if a supply amount of the air is increased with an increase in the power generation amount, an amount of heat deprived from the system 1A due to the low-temperature air supplied increases. Therefore, the diaphragms 6a of the air supply unit 6 tends to be lowered in temperature and hardened. To avoid this, the fuel cell system 1A of the present embodiment is configured to increase or decrease an amount of heat generated in the heating unit 30, based on the power generation amount or the supply amount of the air. The operation of the system 1A will be described specifically.

Figure 3:
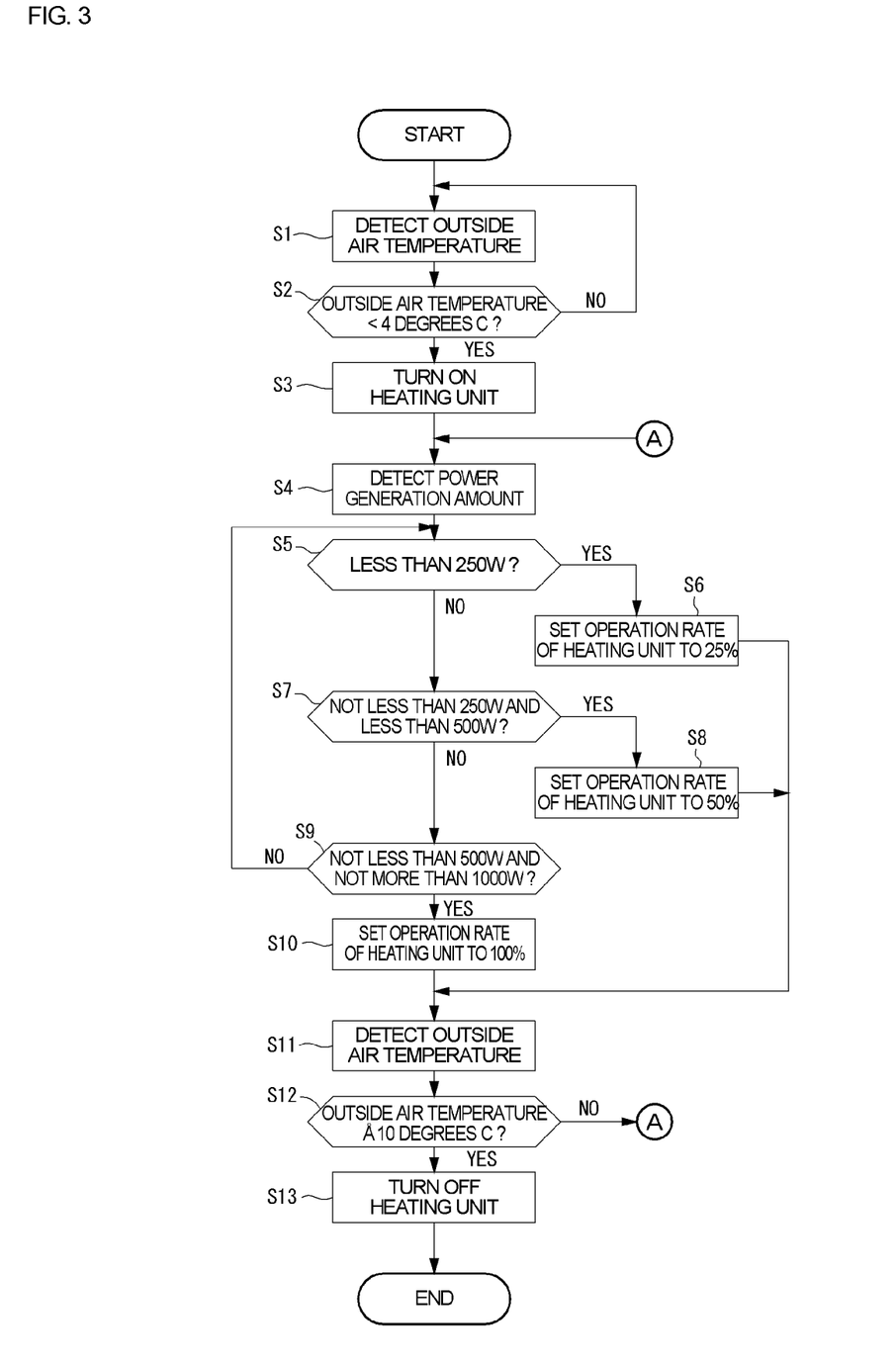
FIG. 3 is a flowchart showing another operation of the fuel cell system.

FIG. 3 is a flowchart showing another operation of the fuel cell system 1A, and an operation of the system 1A in the case where the amount of heat generated in the heating unit 30 is adjusted based on the power generation amount. As shown in FIG. 3, the control unit 40 obtains a detected temperature of the temperature sensor 33 at a suitable timing (step S1). The control unit 40 determines whether or not the outside air temperature is lower than the predetermined temperature Tb (e.g., 4 degrees C.) (step S2). If it is determined that the outside air temperature is not lower than the predetermined temperature Tb (step S2: NO), the control unit 40 need not actuate the heating unit 30, and repeats step S1 and the following steps. On the other hand, if it is determined that the outside air temperature is lower than the predetermined temperature Tb (step S2: YES), the control unit 40 switches the heating unit 30 from OFF to ON (step S3), and then detects the power generation amount in the fuel cell 4 (step S4).

The control unit 40 determines which ranges, i.e., a range less than 250 W, a range which is not less than 250 W and less than 500 W, and a range which is not less than 500 W and not more than 1000 W, the power generation amount falls into, and decides an operation rate of the heating unit 30 in correspondence with the range into which the power generation amount falls (step S5 to step S10). Specifically, the operation rate of the heating unit 30 is set higher as the power generation amount is greater, and the heating unit 30 is operated at the set operation rate.

If it is determined that the power generation amount is less than 250 W (step S5: YES), the control unit 40 sets the operation rate (if a drive signal has a periodicity, its duty ratio) of the heating unit 30 to 25% (step S6), and operates the heating unit 30 with this operation rate. If it is determined that the power generation amount is not less than 250 W (step S5: NO), the control unit 40 determines whether or not the power generation amount falls into a range which is not less than 250 W and less than 500 W (step S7). If it is determined that the power generation amount falls into the range which is not less than 250 W and less than 500 W (step S7: YES), the control unit 40 sets the operation rate of the heating unit 30 to 50% (step S8) and operates the heating unit 30 with this operation rate. If it is determined that the power generation amount does not fall into the range which is not less than 250 W and less than 500 W (step S7: NO), the control unit 40 determines whether or not the power generation amount falls into a range which is not less than 500 W and not more than 1000 W (step S9). If it is determined that the power generation amount falls into the range which is not less than 500 W and not more than 1000 W (step S9: YES), the control unit 40 sets the operation rate of the heating unit to 100% (step S10) and operates the heating unit 30 with this operation rate. If it is determined that the power generation amount does not fall into the range which is not less than 500 W and not more than 1000 W (step S9: NO), there is a possibility of incorrect determination, and therefore step S5 and the following steps are repeated.

After starting the operation of the heating unit 30 with the operation rate corresponding to the power generation amount, the control unit 40 detects the outside air temperature again (step S11). The control unit 40 determines whether or not the detected temperature is equal to or higher than the predetermined temperature Tc (e.g., 10 degrees C.) (step S12). If it is determined that the outside air temperature is lower than the temperature Tc (step S12: NO), the step S4 and the following steps are repeated, and thereby the controller 40 executes the operation of the heating unit 30 with the operation rate corresponding to the power generation amount, which changes with a passage of time. On the other hand, if it is determined that the outside air temperature is not lower than the temperature Tc (step S12: YES), the controller 40 switches the heating unit 30 from ON to OFF and stops (deactivates) the heating unit 30 (step S13).

As described above, the fuel cell system 1A is configured to increase or decrease the heat generated in the heating unit 30 based on the power generation amount. Therefore, in the case where the power generation amount is increased, it is possible to prevent the temperature of diaphragms 6a from being lowered with the increase in the amount of air introduced, while in the case where the power generation amount is decreased, it is possible to prevent the introduced air from being heated excessively and thereby energy from being consumed wastefully.

The above mentioned operation flow may be executed in the middle of the power generation state in which the fuel cell 4 is generating the electric power, or may be started in the start-up state in which the fuel cell 4 is not generating the electric power yet. In a case where step S1 and the following steps are executed in a state in which the fuel cell 4 is not generating the electric power yet, it is sufficient that the fuel cell 4 shifts to the power generation state before at least step S4.

Instead of executing step S5 and the following steps again in the case where the power generation amount detected in step S4 does not fall into any of the ranges in step S5, step S7, and step S9, in the flowchart shown in FIG. 3 (step S9: NO), the step 4 for detecting the power generation amount and the following steps may be executed. Thus, in the case of misdetection of the power generation amount, the step S5 and the following steps are performed again using a correct power generation amount.

As in the case of FIG. 2, in the operation shown in FIG. 3, the reference temperature Tb at which the heating unit 30 is switched to ON and the reference temperature Tc at which the heating unit 30 is switched to OFF may be suitably set. For example, the temperature Tb may be set to a value in a range of 0 degrees C. to 10 degrees C., and more preferably a value in a range of 3 degrees C. to 5 degrees C. The temperature Tc may be preferably set to a value in a range of 8 degrees C. to 12 degrees C.

Embodiment 2

Figure 4:
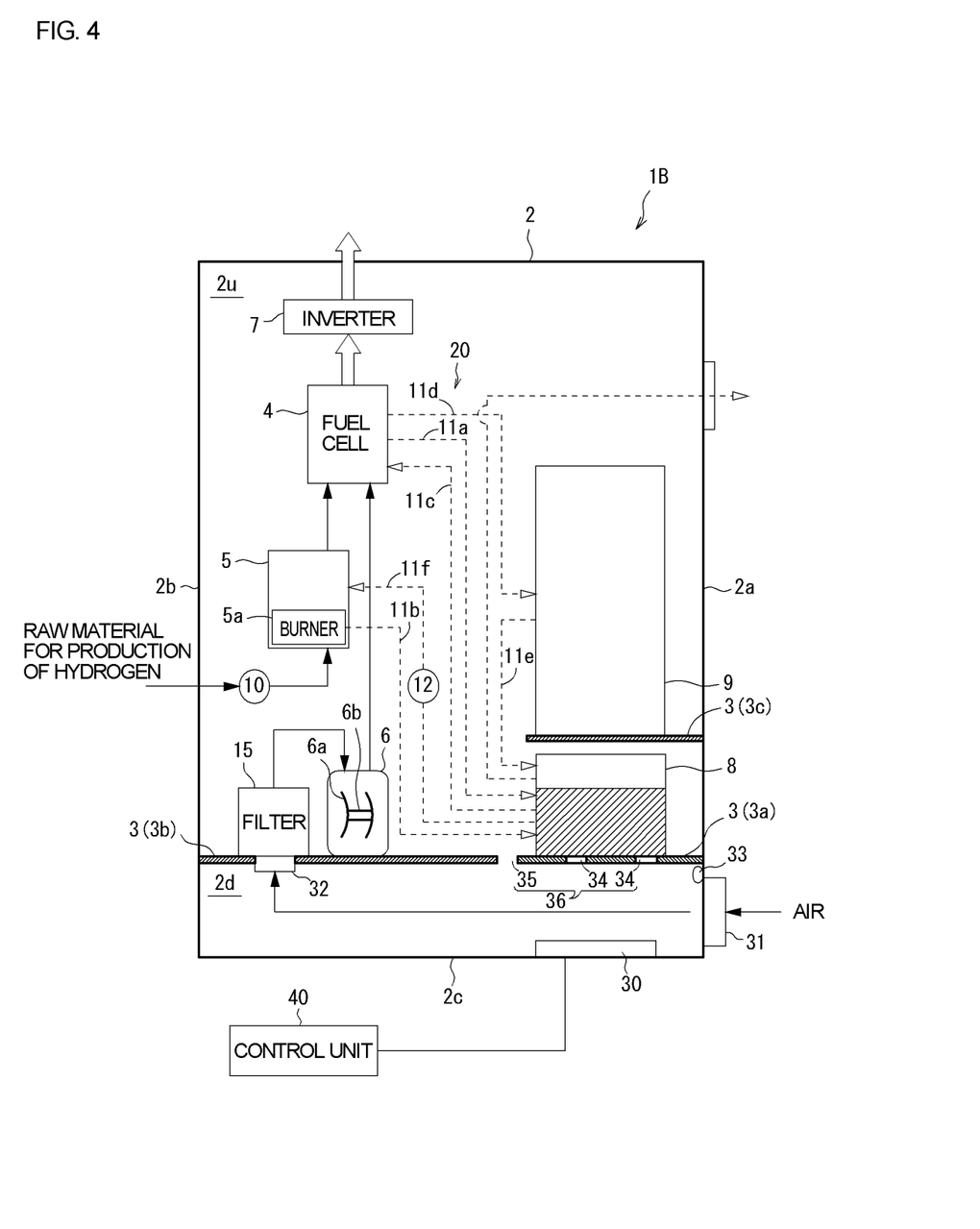
FIG. 4 is a schematic view showing a configuration of a fuel cell system according to Embodiment 2 of the present invention.

FIG. 4 is a schematic view showing a configuration of a fuel cell system 1B according to Embodiment 2 of the present invention. The fuel cell system 1B of FIG. 4 is identical to the fuel cell system 1A of FIG. 1 except that a filter 15 is provided at the air introduction passage 13. Hereinafter, a difference between them will be in a larger part described, and the same components as those of the fuel cell system 1A of FIG. 1 will not be described in detail.

More specifically, as shown in FIG. 4, the filter 15 is placed on the upper surface of the second separating plate 3b so as to correspond to the communication port 32. The filter 15 is positioned closer to the second side wall 2b rather than the first side wall 2a. An inlet (not shown) of the filter 15 is connected to the communication port 32, while its outlet is connected to the air supply unit 6 by means of a pipe. By actuating the air supply unit 6, the filter 15 takes in the air from the outside air introduction space (lower space) 2d through the communication port 32, and captures foreign matters in the air. The air from which the foreign matters have been removed is sent from the filter 15 to the air supply unit 6 through the pipe.

When the air introduction passage 13 configured such that the communication port 32 is connected to the air supply unit 6 by means of the pipe is compared to the air introduction passage 13 provided with the filter 15, the latter air introduction passage 13 has a greater heat capacity because of the filter 15. As should be understood from the function of the filter 15 for removing the foreign matters from the air, the filter 15 has a greater area which the air passing therethrough contacts. Because of this, the filter 15 exchanges heat with the air passing therethrough, and thereby gains heat in great amount. Since the filter 15 is placed on the separating plate 3 in the present embodiment, the separating plate 3 is heated by the heating unit 30 and thereby the filter 15 is heated via the separating plate 3.

Since the filter 15 can store the heat generated in the heating unit 30 as described above, a change in the temperature of the air introduced into the air supply unit 6 can be lessened. Since the suction port 31 is positioned upstream of the heating unit 30, and the temperature sensor 33 is provided in the vicinity of the suction port 31, the temperature detected by the temperature sensor 33 rapidly decreases upon the heating unit 30 being stopped. On the other hand, the air is supplied to the air supply unit 6 of the diaphragm type, after passing through the filter 15 at an upstream side. The air introduction passage 13 provided with the filter 15 has a relatively large heat capacity and can warm up the air passing through the filter 15 even in the state in which the heating unit 30 is stopped.

Therefore, even if the heating unit 30 is stopped and the temperature of the introduced air rapidly decreases, a temperature decrease in the air introduced into the air supply unit 6 can be lessened because the air is warmed-up by the filter 15. When the heating unit 30 is actuated to heat the air, the filter 15 deprives a portion of the heat from the air heated inside of the outside air introduction space 2d. Therefore, even when the heating unit 30 is actuated and the temperature of the introduction space rapidly rises, a temperature increase in the air introduced into the air supply unit 6 can be lessened by heat exchange in the filter 15.

Since the heat capacity of the air introduction passage 13 is increased by providing the filter 15 as described above, a temperature change in the air introduced into the air supply unit 6 due to ON and OFF of the heating unit 30 can be lessened. In a right area of a chart 4 in FIG. 2, a temperature change in the air introduced into the air supply unit 6 in the case where the filter 15 is provided (bold solid line) and a temperature change in the air introduced into the air supply unit 6 in the case where the filter 15 is not provided (thin solid line) are depicted. As can be seen from the chart 4, the temperature change in the air introduced into the air supply unit 6 can be made lesser in the case where the filter 15 is provided than in the case where the air filter 15 is not provided. In the case where the air filter 15 is provided, the temperature of the air increases or decreases near a median value (mid value) in the range of the temperature Tb to the temperature Tc. Therefore, it is possible to more surely prevent the diaphragms 6a from being hardened by the low-temperature air.

The configuration of the filter 15 is not particularly limited, so long as the filter 15 is capable of substantially removing the foreign matters from the air. For example, in the case of the filter 15 including a filter case and a filtering member, the filter case may be formed of polypropylene, polyethylene, ABS resin, urethane resin, etc. It is estimated that the filter 15 having such a structure has a total weight of about 100 g to 300 g as the filter 15 used in the fuel cell system 1B for household use. Therefore, it can be expected that the filter 15 serves as a heat storage section having a great heat capacity.

Embodiment 3

Figure 5:
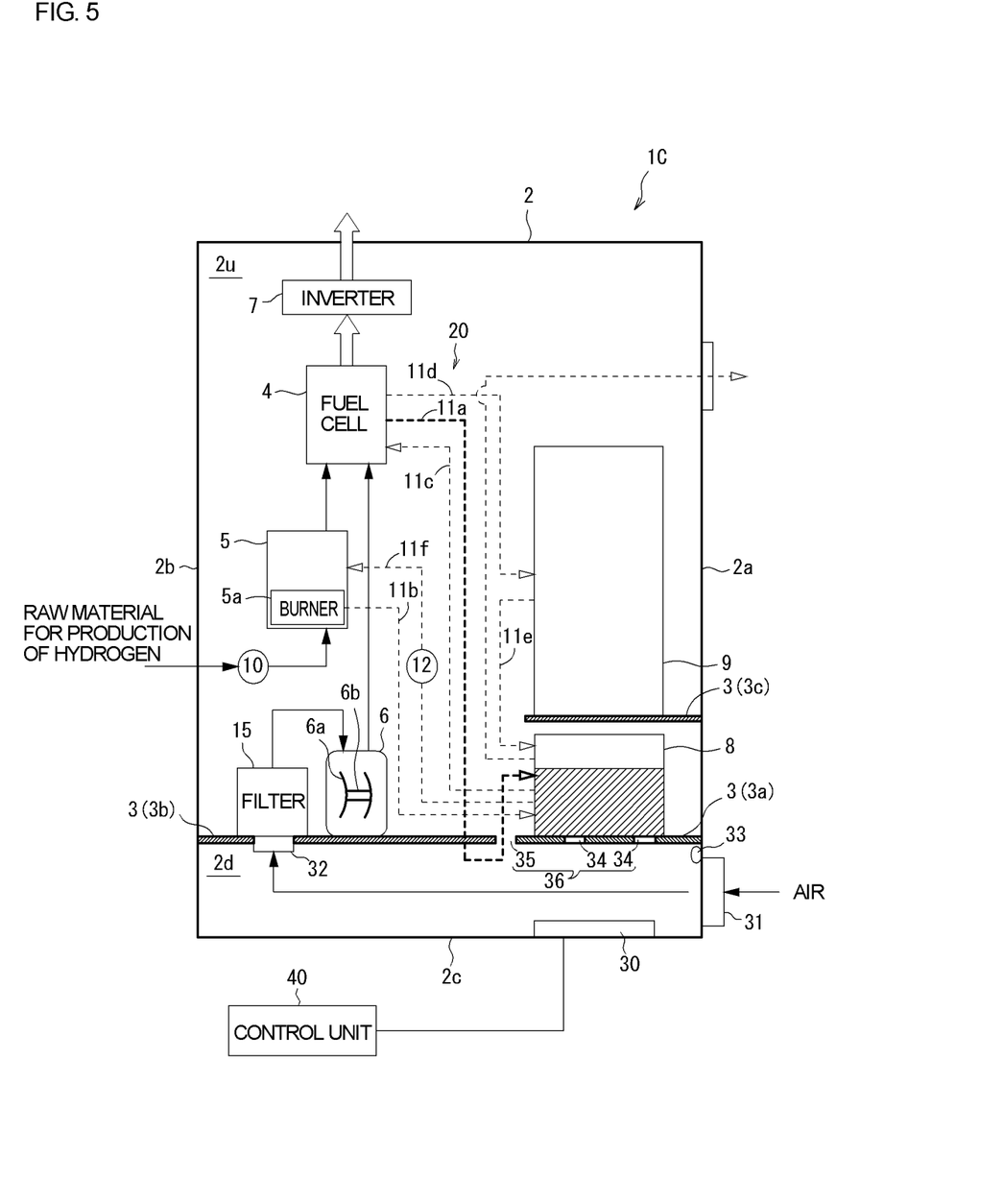
FIG. 5 is a schematic view showing a configuration of a fuel cell system according to Embodiment 3 of the present invention.

FIG. 5 is a schematic view showing a configuration of a fuel cell system 1C according to Embodiment 3 of the present invention. The fuel cell system 1C of FIG. 5 is different from the fuel cell system 1B of FIG. 4 in that a portion of the pipe 11a constituting the water circuit 20 extends beyond the separating plate 3 and protrudes from the upper space 2u into the outside air introduction space (lower space) 2d. In other words, a portion of the pipe 11a is exposed within the outside air introduction space 2d. The other configuration is identical to that of the fuel cell system 1B of FIG. 4, and will not be described in detail.

With such a configuration, the portion of the pipe 11a which is exposed within the outside air introduction space 2d is heated by the heating unit 30, and thereby the water within the water circuit 20 can be prevented from being frozen. In the example shown in FIG. 5, a route of the pipe 11a is set such that the portion of the pipe 11a extends through a space near the heating unit 30. Therefore, the portion of the pipe 11a can be heated more efficiently by the heating unit 30. In the example shown in FIG. 5, the portion of the pipe 11a is located downstream of the heating unit 30 (downstream in a flow direction of the outside air). Therefore, the heat generated in the heating unit 30 can be transferred efficiently to the portion of the pipe 11a located downstream of the heating unit 30, by the air flowing.

Although in the present embodiment, the portion of the pipe 11a is exposed within the outside air introduction space 2d, the present invention is not limited to this, so long as a portion of the water circuit 20 is exposed within the outside air introduction space 2d and the exposed portion is heated. The portion of the water circuit 20 may be one or a plurality of the followings: for example, the pipe 11a used to recover the condensed water from the off-gas discharged from the anode or the cathode and supply the recovered water to the water tank 8, the pipe 11b used to recover the condensed water from a combustion exhaust gas from a burner 5a of the fuel gas generating device 5 and supply the condensed water to the water tank 8, and a portion (e.g., bottom portion) of the water tank 8.

In the above stated fuel cell systems 1A to 1C, the separating plate 3 is comprised of the two separating plates which are the first separating plate 3a and the second separating plate 3b as the separating plate 3 for substantially separating the internal space of the casing 2 into the upper space 2u and the lower space 2d. Alternatively, the separating plate 3 may be comprised of three or more plate members, or may be configured such that a plurality of plate members are arranged in a stepwise shape. In the case where the separating plate 3 is configured in the stepwise shape, the suction port 31 through which the outside air is taken in is preferably provided below the plate member located at a lowermost side.

INDUSTRIAL APPLICABILITY

The present invention is suitably applicable to a fuel cell system including an air supply unit of a diaphragm type.

REFERENCE SIGNS LISTS 1A to 1C fuel cell system
2 casing
2d lower space (outside air introduction space)
2u upper space
3 separating plate
4 fuel cell
5 fuel gas generating device
6 air supply unit of a diaphragm type
6a diaphragm
7 inverter
8 water tank
13 air introduction passage
15 filter
20 water circuit
30 heating unit
31 suction port
32 communication port
33 temperature sensor
36 penetrating section
40 control unit

The invention claimed is:
1. A fuel cell system comprising:
a casing having a suction port through which air is introduced from outside into an internal space thereof;
a fuel cell accommodated within the casing and configured to generate electric power through an electrochemical reaction between a fuel gas and an oxidizing gas;
an air supply unit of a diaphragm type disposed within the casing and configured to take in the air introduced through the suction port and supply the air to the fuel cell;
a heating unit disposed within the casing and configured to heat the air in a space from the suction port to the air supply unit;
a separating plate for separating the internal space of the casing into an upper space and a lower space, the separating plate having a communication port via which the upper space and the lower space are communicated with each other;
a fuel gas generating device for generating a fuel gas supplied to the fuel cell, using a raw material and water; and
a water circuit including a condensed water recovery passage for recovering condensed water from at least one of an off-gas from an anode of the fuel cell, an off-gas from a cathode of the fuel cell; and an off-gas from the fuel gas generating device; and a water tank disposed in the upper space to store the condensed water;
wherein the fuel cell, the fuel gas generating device, and the air supply unit are disposed within the upper space, and the air supply unit is communicated with the lower space via the communication port;
wherein the lower space forms an air introduction space through which the air introduced from the suction port flows to the communication port passes,
wherein the heating unit is disposed in the air introduction space; and
wherein the separating plate has a penetrating section via which the upper space and the air introduction space are communicated with each other to supply the air within the air introduction space which is heated by the heating unit, to at least a portion of the water circuit positioned in the upper space.

2. The fuel cell system according to claim 1, wherein at least a portion of the water circuit is exposed in the air introduction space.

3. The fuel cell system according to claim 1, further comprising:
   an air introduction passage extending from the communication port of the separating plate to the air supply unit; and
   a filter provided at the air introduction passage to capture foreign matters in the air.

4. The fuel cell system according to claim 1, further comprising:
   a control unit for controlling an operation of the heating unit;
   wherein the control unit causes the heating unit to heat the air prior to start of the operation of the air supply unit.

5. The fuel cell system according to claim 1, further comprising:
   a control unit for controlling an operation of the heating unit; and
   a temperature sensor for detecting a temperature of the air supplied to the air supply unit;
   wherein the control unit causes the heating unit to heat the air when the temperature of the air supplied to the air supply unit which is detected by the temperature sensor is lower than a predetermined value.

6. The fuel cell system according to claim 1, further comprising:
   a control unit for controlling an operation of the heating unit;
   wherein the control unit obtains an amount of power generation in the fuel cell or an amount of the air supplied from the air supply unit during a power generation operation of the fuel cell, and causes the heating unit to increase heat applied to the air as the obtained value is greater.

* * * * *